Nov. 10, 1970 W. PARISOE 3,539,819

MULTIPLE-CHANNEL REMOTE CONTROL SYSTEM

Filed May 27, 1968 2 Sheets-Sheet 1

Inventor
Wilbert Parisoe
By John J. Pedersen
Attorney

MULTIPLE-CHANNEL REMOTE CONTROL SYSTEM

Filed May 27, 1968 2 Sheets-Sheet 2

Inventor
Wilbert Parisoe
By John J. Pederson
Attorney

United States Patent Office 3,539,819
Patented Nov. 10, 1970

3,539,819

MULTIPLE-CHANNEL REMOTE CONTROL SYSTEM

Wilbert Parisoe, Highland Park, Ill., assignor to Zenith Radio Corporation, Chicago, Ill., a corporation of Delaware Filed May 27, 1968, Ser. No. 732,434
Int. Cl. H02j 3/14
U.S. Cl. 307—38 13 Claims

ABSTRACT OF THE DISCLOSURE

A remote control system of the type responsive to control signals of a continuous-wave nature and of a plurality of different control frequencies for selectively energizing any of a corresponding plurality of controlled devices from a common energy source. A microphone and amplifier combination is utilized to convert a received sonic control signal into an electrical output signal suitable for detection by a scanner. The scanner comprises a motor-driven sequence switch having a frequency-selective device (such as an inductor) connected to each of the switch contact positions; each component is tuned to a different control frequency corresponding to a different controlled device. The movable contact of the switch sequentially selects one of the particular devices to complete a bridged-T null circuit and a null is obtained when the device tuned to the received control frequency is attained. The system is essentially immune to extraneous signals. Moreover, when a particular function has been selected, the other functions cannot be inadvertently energized during the operation of the selected function.

BACKGROUND OF THE INVENTION

The convenience and desirability of remote control systems are well-known. They enable a user to easily and efficiently operate equipment which is inconveniently located or even inaccessible under normal conditions. Such a system is quite obviously more attractive, safe, and efficient when there is no physical connection (such as wires) between the remote control unit and the unit being operated. Consequently, various systems have been contrived using sonic, ultrasonic, optic, or other signals transmissible by air.

Present wireless remote control systems have two serious limitations: first, they employ an elaborate—therefore complicated and expensive—and essentially separate combination of detectors, amplifiers, actuators, etc., to operate each control function; second, they are inherently susceptible to extraneous signals. For a system requiring only a few remotely controlled devices or functions, the expense and complexity of separate circuitry for each function is not excessive. In a system using sonic signals, for example, random noises such as those generated by jingling keys, telephone bells and the like often interfere with the conventional wireless remote control system and trigger it incongruously. Incorporating sharply-tuned circuits partially alleviates the extraneous signal problem, although it is somewhat awkward and costly.

Modern technology has provided an abundance of time-saving and labor-saving devices which have freed man from many of the routine, mundane operations that have plagued his existence, thereby permitting him to enjoy more leisure time and to a greater extent. The discovery and development of the television receiver has provided a major contribution to mankind's leisure-time enjoyment as well as to important industrial operations. The usefulness of TV has been greatly enhanced by the incorporation of remote control. Most communities are able to receive at least four or five different TV channels, consequently TV viewers have a substantial variety of program selection. To have to get up from a comfortable vantage point each time one wants to watch a program on a different channel (which also often entails adjusting the receiver with respect to volume, etc. because the quality of reception varies from channel to channel) is annoying and detracts from the overall enjoyment derived from watching TV. In addition, a more satisfactory picture adjustment may be made by a viewer at a normal viewing distance than from a position "on top of" the TV set. In situations where the TV receiver is located in a relatively high place, such as one built into a wall in a den or above a bar, it is particularly bothersome and even dangerous to have to get up, obtain a chair or ladder, place it below the set, and ascend it in order to change channels, adjust the volume, etc. Furthermore, many bedridden patients pass away their innumerable idle hours to a great extent by means of the entertainment provided by television. In their case, it is essential to provide a simple-to-operate remote control system if they are to be allowed to derive full enjoyment from their TV set.

The advent of color TV, however, has especially demonstrated the inability of conventional remote control systems to economically and effectively adapt themselves to a multiple-function system comprising more than a few functions. The color TV viewer desires to remotely adjust the same controls as for a black and white TV receiver (channel, volume, on-off) plus two additional controls, hue and color level. It is readily apparent that the ability to be able to adjust each of these controls in both directions is also highly desirable. Consequently, a very desirable number of remotely controllable functions for a color television receiver is ten. A conventional remote control system capable of controlling ten functions is commercially prohibitive in terms of cost and complexity.

It is therefore an object of this invention to provide a new and improved remote control system which is efficient and simple to operate.

It is another object of the invention to provide a new and improved remote control system which is immune to extraneous signals.

It is a further object of the invention to provide a new and improved remote control system which is economically adaptable to control a small or large (ten or more) number of functions.

SUMMARY OF THE INVENTION

In accordance with the invention, a new and improved multiple function remote control system, responsive to any of a plurality of control signals of different predetermined frequencies to selectively actuate any of a corresponding plurality of respectively assigned control functions, comprises a corresponding plurality of selective networks respectively tuned to the control signal frequencies and a corresponding plurality of control devices each assigned to actuate one of the control functions. Means responsive to any of the control signals are provided for scanning the networks to select the one tuned to the frequency of the received control signal. Also provided are means responsive to completion of the scanning operation to generate a predetermined control effect, and means responsive to the control effect for disabling the scanning means and actuating the control device assigned to perform the desired control function.

BRIEF DESCRIPTION OF THE DRAWINGS

The features of the present invention which are believed to be novel are set forth with particularlity in the appended claims. The invention, together with further objects and advantages thereof, may best be understood by reference to the following description taken in connection with the accompanying drawings in the several figures of which like reference numerals identify like elements, and in which:

DESCRIPTION OF THE PREFERRED EMBODIMENT

Figure 1:
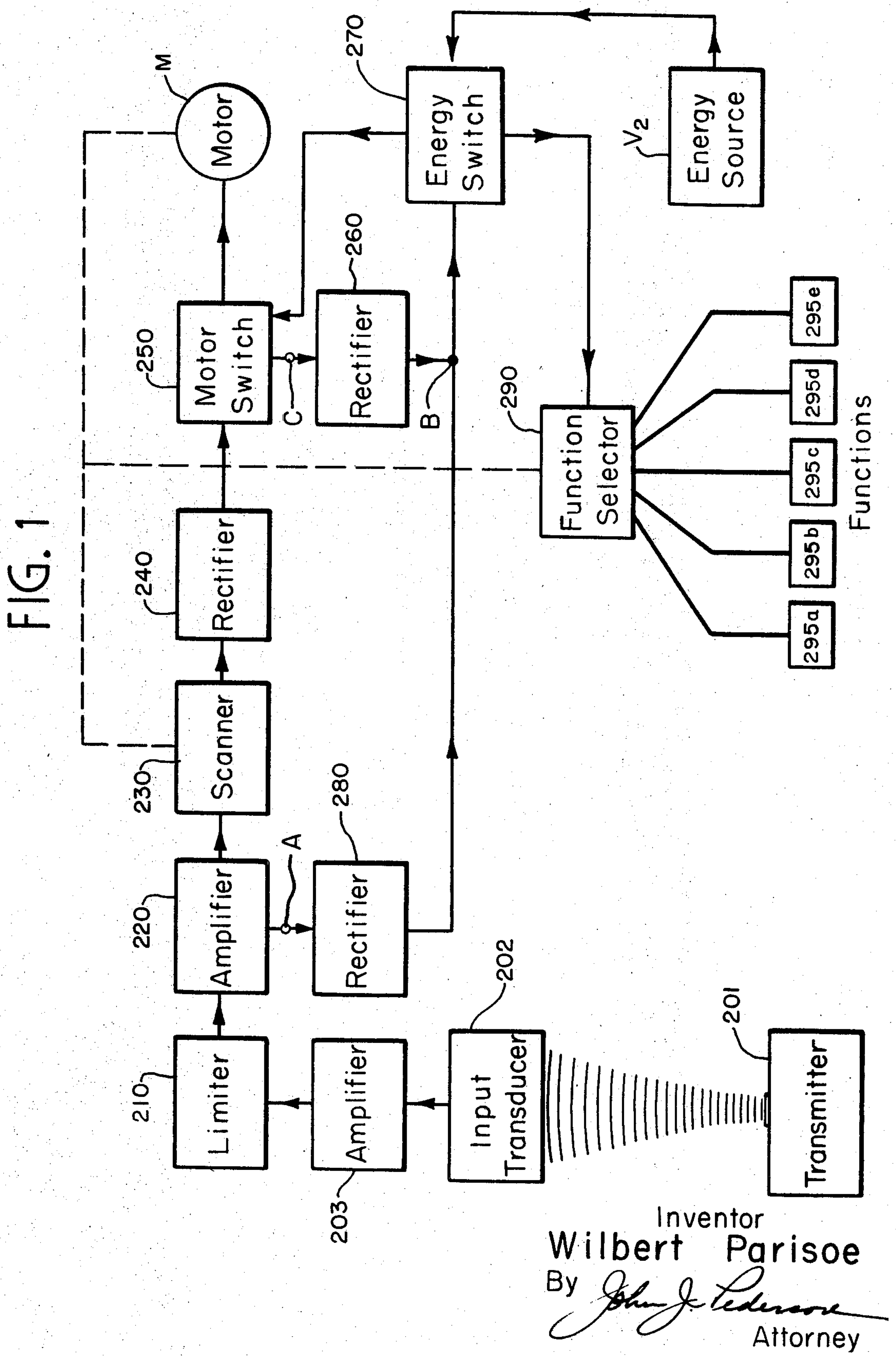
FIG. 1 is a block diagram of a preferred embodiment of the invention.

In FIG. 1, an embodiment of the invention is shown in a block diagram form in order to give a brief overall picture of the basic construction and operation of the invention. A transmitter 201, capable of producing a signal of a continuous-wave nature for each controlled device or function (in this embodiment, functions 295*a*, 259*b*, 295*c*, 295*d*, 295*e*), transmits the signal corresponding to the desired function to an input transducer 202 where the signal is received and converted into an electrical signal. The amplifier 203 amplifies this electrical signal and applies it to a limiter stage 210 wherein the electrical signal is amplified to a predetermined maximum amplitude. Another amplifier 220 is used to further increase the magnitude of the electrical signal to a level sufficient to be utilized by the scanner 230. In addition, a portion of the amplified electrical signal is developed by amplifier 220 and provided at terminal A. The operation thus far described may be accomplished by various conventional structures.

In accordance with the invention, however, the scanner produces a control effect which is converted into a DC control signal by rectifier 240. The motor switch 250 is responsive to this DC control signal and operates in series with the energy switch, which is normally in the "motor" position, to energize the motor. The motor M is used to concomitantly drive the scanner and the function selector. The motor switch also produces an indicating signal at terminal C when the motor is energized. Rectifier 260 converts this indicating signal into a counter-bias signal which is applied to junction B. Rectifier 280 converts the portion of the AC electrical signal developed by amplifier 220 and appearing at terminal A into a bias signal which is also applied to junction B. The signal appearing at junction B is thus a summation of the signals from the two rectifiers, 260 and 280. The energy switch 270 is responsive to the signal(s) appearing at junction B to alternatively couple the energy source $V_2$ to either the motor M or the function selector 290. The function selector 290 couples the energy source $V_2$ to the selected control device assigned to perform the desired control function from the group of functions, 295*a*, 295*b*, 295*c*, 295*d*, and 295*e*, when the energy switch is in the "function selector" position. A control device may be an electric motor, for example, which is mechanically coupled to a potentiometer in the audio circuit of a television receiver. Selecting one function (e.g., 295*a*) energizes the motor in such a manner as to rotate the potentiometer in a direction which increases the audio output of the receiver, whereas selecting another function (e.g., 295*b*) energizes the motor in such a manner as to rotate the potentiometer in the opposite direction, thereby decreasing the audio output of the receiver. It is understood that the number of functions in this particular embodiment has been limited to five solely for the purpose of illustration; the adaptability of the invention to accommodate any number of functions will be discussed subsequently in greater detail.

The transmission of a signal corresponding to the function the operator wishes to control initiates the operation of the invention. In an essentially straightforward manner, the transmitted signal is received by the input transducer 202 and converted into an electrical signal therein and is amplified by amplifier 203, limiter 210, and amplifier 220 to a level suitable for application to scanner 230.

In accordance with the invention, scanner 230 comprises a motor-driven movable selector, a frequency-selective network, and a plurality of frequency-selective devices capable of being sequentially selected by the movable selector. Each device constitutes a "missing link" in the frequency-selective network and, upon being connected into the network by the movable selector, completes the network, thereby providing a frequency-selective network with a plurality of resonant frequencies, each resonant frequency corresponding to the frequency of one of the signals produced by the transmitter.

As a result, the scanner produces a predetermined control effect only for an input frequency identical to one of the resonant frequencies. The predetermined control-effect may be either the presence or absence of a signal of an established level, depending upon arbitrary design considerations. Where noise immunity is especially important, the frequency-selective network may be constructed in the form of a null circuit, in which case there is an absence of any signal when a resonant frequency position is obtained. The control effect of the scanner causes the motor switch to shift to the motor-energizing or "on" position and maintain the scanning action until the proper network is selected. Thus, assuming the network is of the null variety, as long as a device selected by the movable selector does not tune the frequency-selective network to the frequency of the received signal, there is a control effect present which maintains the motor switch in the "on" position. The scanner therefore continues to operate until it selects the device which tunes the frequency-selective network to the frequency of the received signal, whereupon the signal appearing at terminal C decreases sharply, due to the null phenomenon, causing the motor switch to shift to the motor denergizing or "off" position at which time the motor and scanner are stopped. The function selector is of course also stopped and is thereby positioned at the desired function corresponding to the transmitted control frequency. All that remains now is to apply energy to the control device assigned to actuate this function.

Energy switch 270 alternatively couples the energy source $V_2$ to either the motor M or the function selector 290 depending upon the signal appearing at junction B. In this embodiment, the energy switch remains in the "motor" position in the absence of signal at junction B. When a signal is received by the input transducer, the portion of the electrical signal developed by amplifier 220 at terminal A is converted into a bias signal by rectifier 280 and applied to terminal B. This bias signal alone is sufficient to actuate the energy switch, thereby shifting the energy source from the motor to the function selector. A small amount of time delay is incorporated in rectifier 280, however, in order to prevent the bias signal from prematurely actuating the energy switch before the scanner begins to operate.

Motor switch 250 develops an indicating signal at terminal C in response to energization of the motor. A counterbias signal is derived from this indicating signal by rectifier 260 and is applied to junction B. This counterbias signal is fashioned such that it is of opposite polarity and sufficient amplitude to override the bias signal from rectifier 280, which also is present at junction B, and thereby prevent the energy switch from being thrown to its "function" position. As a result, a function cannot be inadvertently actuated during the scanning operation of the system.

When the scanner selects the component that tunes the frequency-selective network to the frequency of the received signal, the motor stops and the indicating signal developed by the motor switch at terminal C ceases. This eliminates the counterbias signal developed by rectifier 260, leaving only the bias signal from rectifier 280 present at junction B, and permits actuation of the energy switch to shift the energy source from the motor to the function selector. The function selector in turn couples the energy source to the control device assigned to actuate the selected function.

The function thus actuated continues to operate so long as the particular transmitted signal is received by the system. The operator continues transmitting the particular signal until he has operated the function to his satisfaction. He then stops transmitting the signal, removing the bias signal from junction B, and allows the energy switch to return to the "motor" position. With no incoming signals, the motor switch remains in the "off" position; hence the system is in its quiescent state and is ready for another operation.

An extraneous signal received by the input transducer 11 is, of course, also converted to an electrical signal and, after being operated on by the conventional amplifier and limiter stages, actuates the scanner. The scanner does not, however, have a device which can tune the frequency-selective network to the frequency of the extraneous signal. The scanner therefore continues to produce a control effect which maintains the motor switch in the "on" position, thereby causing the motor to continue to drive the scanner. As long as the motor remains energized, the indicating signal is developed at terminal C from which the rectifier 260 develops the counterbias signal that is applied to junction B, thus preventing the energy switch from being operated. Consequently, the only effect of an extraneous signal is to operate the scanner. It cannot stop the scanner at any position and therefore it cannot actuate the energy switch to inadvertently actuate a function.

Figure 2:
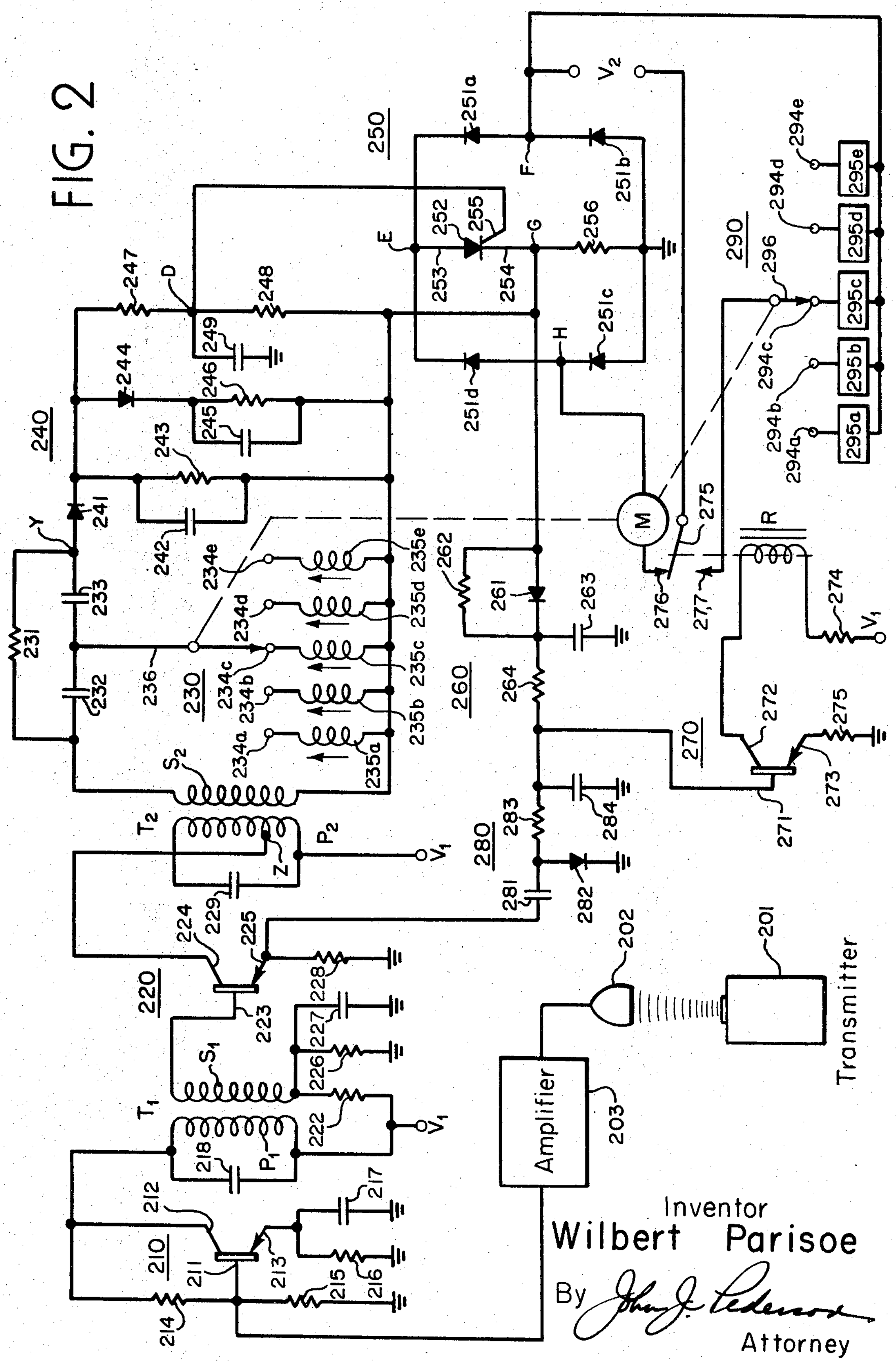
FIG. 2 is a schematic diagram of a preferred embodiment of the invention.

With reference to FIG. 2, the schematic diagram of the preferred embodiment of the invention shows a transmitter 201, capable of producing a plurality of different desired frequencies each associated with a different respective function (295*a*, 295*b*, 295*c*, 295*d*, and 2955*e*) to be remotely controlled, which is used to transmit a signal to the input transducer 202. The transmitter-input transducer portion of the system may be any compatible combination whose final output signal is electrical. Typical combinations use radio, acoustic, or light signals for the transmission. It is also understood that, for purposes of illustration and discussion, only five functions are shown, but as will be discussed subsequently in greater detail, the invention may accommodate any desired number of functions.

The input transducer receives the transmitted signal and converts it into an electrical signal which is coupled to the amplifier 203. The amplified electrical signal produced therein is coupled to the limiter stage at the base 211 of the limiter transistor 210. The limiter stage is entirely conventional and comprises two biasing resistors, 214 and 215, and an emitter impedance comprising the combination of resistor 216 and capacitor 217 connected in parallel between the emitter 213 and ground. The collector 212 is coupled to a DC supply voltage $V_1$ by means of the primary winding $P_1$ of coupling transformer $T_1$. Winding $P_1$ is tuned by parallel capacitor 218 to limit the bandwidth of the system. The limiter stage is biased such that it produces an output signal of uniform magnitude at the input winding $P_1$ in response to input signals of varying magnitude coupled to base 211.

An additional stage of amplification is provided in a conventional manner by transistor 220. One end of the secondary winding $S_1$ of coupling transformer $T_1$ is connected to DC supply voltage $V_1$ by means of bias resistor 222. The other end of secondary winding $S_1$ is connected to the base 223 of transistor 220 in order to couple the electrical signal from the limiter transistor 210 to the transistor 220. Resistor 226 completes the DC biasing network of transistor 220 and capacitor 227 provides an AC bypass of the network in order to maximize the amount of signal applied to transistor 220. An emitter resistor 228 is used to couple the emitter 225 of transistor 220 to ground and it is left unbypassed in order to develop a portion of the output signal across it. The DC supply voltage $V_1$ is applied to the collector 224 by means of a tapped position Z or primary winding $P_2$ of coupling transformer $T_2$. The primary winding $P_2$ is tuned by the parallel capacitor 229. As mentioned in the description of the embodiment of FIG. 1, the above-described portion of the invention is quite straight-forward and may be performed by various conventional structures without adversely affecting the invention.

In accordance with the invention, the amplified signal provided at the primary winding $P_2$ by transistor 220 is coupled to the scanner 230 by means of the secondary winding $S_2$ of the coupling transformer $T_2$. In this particular embodiment the scanner 230 comprises a bridged-T null circuit consisting of resistor 231 in parallel with the series combination of capacitors 232 and 233, and a selected one of the coils 235*a*, 235*b*, 235*c*, 235*d* and 235*e* coupled to the junction of capacitors 232 and 233. Quite obviously there are many such frequency-selective circuits which may be substituted for the null-detecting circuit shown. It is also well known that capacitors 232 and 233 may be replaced by suitable inductors and that the coils 235*a* through 235*e* may be replaced by the appropriate value capacitors. Further, in applications of the invention where noise immunity is not critical, the null-detecting circuit may be replaced by a peak-detecting circuit. A movable selector 236 is driven by the motor M to sequentially select each one of the coils 235*a* through 235*e* and thereby sequentially tune the bridged-T null circuit to each one of the predetermined frequencies of the transmitter 201.

The control effect produced by the scanner 230 when it is off resonance is an AC signal in this embodiment which appears at junction Y where it is coupled to half-wave rectifier 240 comprising diode 241, capacitor 242, and resistor 243 to provide a DC control signal in response to the scanner control effect. The combination of diode 244 in series with the parallel combination of capacitor 245 and resistor 246 is added to the rectifying circuit as shown in order to provide a clipping action for short duration transient signals in order to damp out instantaneous, spurious signals received by the system. Since the scanner is actuated in response to any received signal except a signal of the particular frequency to which the null circuit is tuned at the moment of reception, this time delay reduces the amount of scanner movement and thereby increases its operational life. Capacitor 249 is connected between junction D and ground to provide further smoothing of the DC signal. The output of the rectifying circuit, which is essentially a constant DC signal, is applied to the input of the motor switch 250 at junction D by means of the divider network formed by resistors 247 and 248.

The motor switch 250 comprises a diode bridge formed by diodes 251*a*, 251*b*, 251*c* and 251*d* and a silicon controlled rectifier (SCR) 252. The silicon controlled rectifier is of the conventional variety which, as is well known, provides either a high impedance path (open circuit) or an essentially short circuit path depending upon the magnitude of the voltage on the gate 255. Hence, the SCR-diode bridge may be used to connect and disconnect an energy source to the motor. In this embodiment, an AC energy source $V_2$ is connected in series with the armature and one of the contacts of a single-pole, double-throw relay, a conventional AC motor M, and the SCR-diode bridge across terminals F and H. The armature 275 of the relay normally engages contact 276, so applying the DC control voltage from rectifier 240 to gate 255 causes the silicon controlled rectifier 252 to provide an essentially short circuit path between terminals E and G, and thus energizes the motor M. Removing the voltage from gate 255 causes the silicon controlled rectifier 252 to provide an open circuit between junctions E and G, thereby deenergizing the motor.

A resistor 256 is connected in series with the silicon controlled rectifier in order to establish a full-wave-rectified DC voltage at terminal G during operation of the motor. When the motor is denergized, there is no current flowing through resistor 256 and consequently no output signal at junction G.

Circuit 260 consists of diode 261, resistor 262, and capacitor 263 and provides a fast-charging, slow-discharging path for capacitor 263 in order to establish a constant DC counterbias signal for application to the base 271 of relay transistor 270 through resistor 264.

Relay transistor 270 and the single-pole, double-throw relay comprising coil R, armature 275, and contacts 276 and 277 constitute an energy switch which alternatively couples the AC energy source $V_2$ to either the motor or the movable selector 296 of function selector 290. Coupling the energy source $V_2$ to the movable selector 296, which is driven concomitantly with movable selector 236, energizes the control device assigned to perform the selected function. The coil R is connected from the collector 272 of transistor 270 to the DC supply voltage $V_1$ through a resistor 274. The emitter 273 is connected to ground through an emitter resistor 275.

Also coupled to the base 271 of relay transistor 270 is a DC bias signal provided by half-wave rectifier 280 which comprises capacitor 281, diode 282, resistor 283, and capacitor 284. Rectifier 280 converts the AC signal developed across the emitter resistor 228 of transistor 220 into a DC bias signal and applies it to base 271. This bias signal alone is sufficient to turn on transistor 270, thereby energizing the relay and switching the energy source from the motor to the selected function. It cannot prematurely actuate the energy switch, however, because the time constant of resistor 283 and capacitor 284 provides a sufficient amount of time delay to permit the counterbias signal to reach the base 271 first.

In the foregoing discussion, the individual operations of the various circuits comprising the invention have been explained and are essentially conventional in nature. In accordance with the invention, however, the interrelational operation of these circuits affords a new and improved remote control system which may operate any number of functions quite efficiently and free from annoying misoperation resulting from, in a sonic transmission embodiment, extraneous noise signals such as doorbells, telephones, rattling keys or coins, etc.

Still referring to FIG. 2, there is shown for the purposes of illustration a function selector 290 comprising the five functions **295*a*, 295*b*, 295*c*, 295*d* and 295*e*, although it is understood that any desired number of controlled devices or functions may be employed. Associated with each function are the contacts 294*a*, 294*b*, 294*c*, 294*d* and 294*e*, respectively, which are individually selected by movable selector 296. The selector 296 of the function selector 290 is driven concomitantly with the selector 236 of the scanner 230, which has respectively associated with each function the coils 235*a* through 235*e* and their respective, sequentially selectable contacts 234*a* through 234*e***. Thus, when the scanner selects the contact corresponding to the coil which tunes the null-detecting circuit to the frequency of the incoming signal, the function selector simultaneously selects the function associated with the particular incoming signal. Hence, it is readily apparent that adapting this system to accommodate additional functions requires the addition of only one coil (or other frequency-selective component) and one contact on each sequence switch for each additional function, a modification which is both simple and economical.

In addition to providing versatility and economy, the remote control system of which the invention comprises also has the highly desirable quality of being completely immune to extraneous signals received by the input transducer. Any received signal of sufficient magnitude and within the bandwidth of the system may operate the scanner but only a signal of a continuous-wave nature whose frequency is identical to one of the resonant frequencies of the scanner may bring about the unique, interrelational operation of the system necessary to permit the selection and operation of a control function.

For example, suppose that an operator wishes to operate function **295*a*. He then uses transmitter 201 to generate the continuous-wave signal corresponding to this function. The form of this operation is not very critical and may be accomplished, for example, by the pushing of a button on the transmitter to cause a superaudible tone or laser beam to be generated and transmitted to an appropriate input transducer 202. The input transducer converts the signal into an electrical signal and the amplifier 203, limiter 210, and amplifier 220 condition this electrical signal to make it suitable for application to the scanner 230**. As thus far described, the operation is straight-forward and conventional.

As depicted in FIG. 2, the movable selector 236 of the scanner is positioned at the "*c*" position (as a result of operating function **295*c* immediately prior to this operation); hence the null circuit is not tuned to the frequency of the incoming signal and an AC output signal (control effect) is consequently produced by the scanner at terminal Y. The rectifier 240 converts this output signal into a DC control signal and applies it to the input terminal (D) of motor switch 250. This control signal turns on the motor switch 250, thereby energizing the motor M which in turn drives the movable selectors 236 and 296. With the motor energized, there is also a full-wave-rectified current flowing through resistor 256 which develops a corresponding voltage at terminal G. Network 260 provides a fast-charge, slow discharge path for the full-wave-rectified DC voltage at terminal G in order to maintain a relatively constant, positive charge on capacitor 263 to constitute a positive counterbias signal which is applied to base 271 of transistor 270 by means of resistor 264**.

The other portion of the amplified incoming AC signal, developed across emitter resistor 228 of transistor 220, is converted into a negative DC bias signal by rectifier 280 and is also applied to the base 271 of relay transistor 270. The magnitude of this negative bias signal is made sufficient to turn on transistor 270; however, the magnitude of the positive counterbias signal is made at least equal to this level so that the transistor 270 cannot be turned on when the counterbias signal is present. With the transistor off, the relay is not actuated and the energy switch is thereby maintained in its "motor" position, thus preventing the energy source $V_2$ from being applied to a control device assigned to perform a control function.

When the movable selector 232 of the scanner 230 attains the contact **234*a*, it completes the bridged-T null circuit with coil 235*a* and tunes the circuit to the frequency of the received signal. With the null circuit at resonance, the output of the scanner is essentially zero. Consequently, there is no AC output signal at terminal Y from which to develop a DC control signal for application to motor switch 250**. The motor switch is therefore turned off, stopping the motor at position "*a*" and eliminating the output signal at junction G. It should be noted that the motor used in this system has a very small moment of inertia in order to permit it to stop precisely at position "*a*" and prevent the possibility of overtravel.

The elimination of the output signal at terminal G results in a corresponding elimination of the positive DC counterbias signal developed across capacitor 263; this permits the negative DC bias signal to turn on relay transistor 270. Turning on the transister 270 actuates the relay and shifts armature 275 from contact 276 (the motor circuit) to contact 277 (the function circuit).

The function thus actuated (**295*a* in this example) is operated for as long as the particular signal is transmitted and received by the input transducer. When the operator desires to stop the function, he merely ceases to cause the transmitter to operate (e.g., he releases the button he depressed in order to operate the transmitter). This removes the AC output signal from the emitter 225 of transistor 220 and thus eliminates the negative DC bias signal at the base 271 of relay transistor 270. The relay transistor 270** is thereby turned off, deenergizing the relay and shifting the energy source $V_2$ from the function back to the motor. The motor is not energized, however, because the motor switch is still in its "off" position.

The noise immunity of this invention is readily apparent inasmuch as any signal received by the input transducer whose frequency is not one of the frequencies to which the bridged-T null circuit is tuned, assuming that the noise signal first of all meets the minimum amplitude requirement of the system and is not of instantaneous duration, merely sets the scanner in motion. The scanner cannot tune itself to the noise frequency and therefore cannot stop the motor and subsequently actuate a function.

Thus the invention provides a new and improved remote control system which is efficient and very simple to operate. Further, it is completely immune to extraneous signals and highly adaptable for the economical incorporation of additional functions.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. A multiple function remote control system responsive to any of a plurality of control signals of different predetermined frequencies to selectively actuate any of a corresponding plurality of respectively assigned control functions, said system comprising:
- a corresponding plurality of frequency-selective devices respectively tuned to said control-signal frequencies;
- a corresponding plurality of control devices each assigned to actuate one of said control functions;
- means responsive to any of said control signals for scanning said frequency-selective devices to select the one tuned to the frequency of the received control signal;
- means responsive to completion of said scanning operation to generate a predetermined control effect;
- and means responsive to said control effect for deenergizing the scanning means and operating the control device assigned to actuate the desired control function.

2. A multiple function remote control system as defined in claim 1, in which said received control signal, in addition to actuating said scanning means, also determines the duration of the actuation of the desired control function.

3. A multiple function remote control system as defined in claim 1, which further comprises means conjointly responsive to said control efffect and to any of said control signals for triggering said disabling means.

4. A multiple function remote control system as defined in claim 3, which further comprises means for delaying the response of the triggering means to said control signals relative to the response of the triggering means to said control effect.

5. A multiple function remote control system as defined in claim 3, in which said triggering means comprises a transistor switching circuit.

6. A multiple function remote control system as defined in claim 1, in which said scanning means comprises an electric motor and a motor-driven sequence switch comprising a movable selector and a corresponding plurality of contacts respectively associated with said plurality of frequency-selective devices.

7. A multiple function remote control system as defined in claim 1, in which the generating means is a null-detecting circuit and the predetermined control effect is a null.

8. In a remote control system of the type responsive to control signals of a plurality of different control frequencies for selectively energizing any of a corresponding plurality of controlled devices from a common energy source, the combination comprising:
- a corresponding plurality of frequency-selective devices each tuned to a different one of said control frequencies;
- means, including a motor adapted for connection to said energy source and a first sequence switch having a movable selector adapted to be driven by said motor, for sequentially applying received control signals to said frequency-selective devices;
- means including an electronic switch for enabling energization of the motor by the energy source;
- means coupled to the movable selector of said sequence switch for developing a predetermined control effect when a control signal is applied to the frequency-selective device turned to its control frequency;
- means for applying said control effect to said electronic switch;
- a second sequence switch also having a movable selector adapted to be driven by the motor and having an input terminal adapted for connection to the energy source and a plurality of output terminals individually connected to one of said control devices;
- and means conjointly responsive to a received control signal and to said control effect for switching the energy source from the motor to the input terminal of said second sequence switch to deenergize said motor and to energize a selected one of said controlled devices.

9. A remote control system, for selectively energizing a plurality of control devices respectively assigned to actuate a corresponding plurality of control functions, which utilizes a plurality of sonic remote control signals of different predetermined frequencies, each such control signal being of a continuous-wave nature and respectively associated with a particular one of said plural functions, comprising:
- a portable transmitter for generating and propagating said control signals;
- a microphone for receiving said control signals and converting them into electrical signals;
- an amplifier coupled to said microphone for amplifying said electrical signals;
- a detector comprising a frequency-selective network and further comprising a plurality of frequency-selective devices individually tuned to a different one of said predetermined frequencies and sequentially connectable to said network, for detecting said control signals and providing a predetermined control effect when any one of said control signals is detected;
- a first movable contact for sequentially connecting said devices to said network;
- a second movable contact mechanically coupled to said first movable contact for selectively enabling energization of each control device;
- an electric motor for driving said movable contacts;
- a first electronic switch normally in a position to enable energization of the motor but responsive to the predetermined control effect for preventing energization of said motor;
- means for providing an indicating signal when the motor is energized;
- a first rectifier circuit responsive to said electrical signal for developing a bias signal;
- means including a second electronic switch, responsive to said bias signal, for deenergizing the motor and energizing the control device assigned to actuate the selected function;
- and a second rectifier circuit for deriving a counter-bias signal from said indicating signal and applying it to said second electronic switch for overriding said bias signal, thereby preventing said second electronic switch from deenergizing the motor and energizing a control device when the detector is not tuned to the frequency of the received sonic signal.

10. A remote control system as defined in claim 9, in which means are provided for delaying said bias signal relative to said counterbias signal at said second switch, thereby preventing premature energization of a control device.

11. A remote control system as defined in claim 9, in which the detector is a null-detecting circuit.

12. A remote control system as defined in claim 9, in which said second electronic switch comprises a transistor-actuated relay.

13. A remote control system as defined in claim 9, in which said electric motor comprises a motor with a moment of inertia small enough to permit it to effectively cease rotation immediately upon being deenergized.

References Cited

UNITED STATES PATENTS 2,817,025 12/1957 Adler ------------ 307—140 X

ROBERT K. SCHAEFER, Primary Examiner

H. J. HOHAUSER, Assistant Examiner

U.S. Cl. X.R.

325—391, 393; 340—156, 171; 307—129, 140